United States Patent
Macbean et al.

(10) Patent No.: US 9,554,444 B2
(45) Date of Patent: Jan. 24, 2017

(54) DEVICE AND METHOD FOR RETROFITTING OR CONVERTING OR ADAPTING SERIES CIRCUITS

(71) Applicant: OV20 Systems, Snohomish, WA (US)

(72) Inventors: Phil Macbean, Manchester (GB); James Terry, Snohomish, WA (US); James Sweet, Woodinville, WA (US)

(73) Assignee: OV20 Systems, Snohomish, WA (US)

( * ) Notice: Subject to any disclaimer, the term of this patent is extended or adjusted under 35 U.S.C. 154(b) by 0 days.

(21) Appl. No.: 13/831,276

(22) Filed: Mar. 14, 2013

(65) Prior Publication Data

US 2014/0167904 A1    Jun. 19, 2014

Related U.S. Application Data

(60) Provisional application No. 61/738,386, filed on Dec. 17, 2012.

(51) Int. Cl.
| | |
|---|---|
| *H01F 27/28* | (2006.01) |
| *H05B 37/00* | (2006.01) |
| *H01F 38/10* | (2006.01) |
| *H05B 37/03* | (2006.01) |

(52) U.S. Cl.
CPC ............. *H05B 37/00* (2013.01); *H01F 38/10* (2013.01); *H05B 37/038* (2013.01); *Y02B 20/72* (2013.01); *Y10T 29/49117* (2015.01)

(58) Field of Classification Search
CPC ......................... H01F 5/00; H01F 27/00–27/30
USPC ............ 336/178, 206–208, 65, 83, 220–223, 336/210–212
See application file for complete search history.

(56) References Cited

U.S. PATENT DOCUMENTS

| | | |
|---|---|---|
| 342,552 A | 5/1886 | Westinghouse, Jr. |
| 1,024,495 A | 4/1912 | Booth et al. |
| 1,466,110 A | 8/1923 | Beckwith et al. |
| 1,660,680 A | 2/1928 | Miller et al. |
| 1,664,170 A | 3/1928 | Hendry |
| 2,066,928 A | 1/1937 | Davis |
| 2,095,306 A | 10/1937 | Austin |
| 2,292,064 A | 8/1942 | Dorgelo et al. |
| 2,341,932 A | 2/1944 | MacCarthy |
| 2,809,329 A | 10/1957 | Stier |
| 3,454,780 A | 7/1969 | Cominassi et al. |
| 3,531,765 A | 9/1970 | Christianson et al. |
| 3,639,805 A | 2/1972 | Muench et al. |
| 3,771,068 A * | 11/1973 | Paget et al. ..................... 333/20 |
| 3,969,649 A | 7/1976 | Jacob |
| 4,006,412 A | 2/1977 | Campbell et al. |

(Continued)

FOREIGN PATENT DOCUMENTS

| | | |
|---|---|---|
| KR | 10-2012-0133925 A | 12/2012 |
| WO | 91/04647 A1 | 4/1991 |

(Continued)

OTHER PUBLICATIONS

International Search Report dated Mar. 26, 2014 for corresponding international application PCT/US2013/075806.

(Continued)

*Primary Examiner* — Tuyen Nguyen
(74) *Attorney, Agent, or Firm* — Quine Intellectual Property Law Group P.C.; Gary Baker

(57) ABSTRACT

Method and device for adapting a series constant power system to operate constant voltage lighting.

21 Claims, 10 Drawing Sheets

Diagram 3

(56) References Cited

U.S. PATENT DOCUMENTS

| | | | |
|---|---|---|---|
| 4,019,167 A | | 4/1977 | Barker |
| 4,305,056 A | * | 12/1981 | Mochida .................. H01F 3/14 29/606 |
| 4,350,935 A | | 9/1982 | Spira et al. |
| 4,628,426 A | * | 12/1986 | Steigerwald .................... 363/17 |
| 4,745,352 A | | 5/1988 | McGuire |
| 4,862,059 A | | 8/1989 | Tominaga et al. |
| 4,912,372 A | | 3/1990 | Mongoven et al. |
| 5,023,541 A | | 6/1991 | Yosinski |
| 5,081,401 A | | 1/1992 | Moisin |
| 5,122,947 A | * | 6/1992 | Hishiki ........................... 363/61 |
| 5,289,110 A | | 2/1994 | Slevinsky |
| 5,581,229 A | | 12/1996 | Hunt |
| 5,905,373 A | | 5/1999 | Pan et al. |
| 5,962,929 A | | 10/1999 | Brosh et al. |
| 6,163,113 A | | 12/2000 | Fu |
| 6,344,699 B1 | | 2/2002 | Rimmer |
| 6,486,618 B1 | | 11/2002 | Li |
| 6,486,825 B1 | | 11/2002 | Smithey |
| 6,628,093 B2 | | 9/2003 | Stevens |
| 6,784,627 B2 | | 8/2004 | Suzuki et al. |
| 6,979,987 B2 | | 12/2005 | Kernahan et al. |
| 7,192,155 B2 | * | 3/2007 | Morrow .................... B64F 1/20 362/153.1 |
| 7,227,314 B1 | | 6/2007 | Gaeta et al. |
| 7,408,306 B2 | | 8/2008 | Tanaka et al. |
| 7,557,517 B2 | | 7/2009 | Jin |
| 7,843,174 B2 | | 11/2010 | Ting |
| 8,040,699 B2 | | 10/2011 | Huynh |
| 8,497,756 B2 | * | 7/2013 | Kiyono .................... H01F 3/14 336/178 |
| 8,665,050 B2 | * | 3/2014 | Lai ........................... H01F 3/12 336/136 |
| 2005/0024877 A1 | | 2/2005 | Frederick |
| 2006/0017399 A1 | | 1/2006 | Matsushima et al. |
| 2008/0094005 A1 | | 4/2008 | Rabiner et al. |
| 2008/0272937 A1 | * | 11/2008 | That ................... H05B 33/0809 340/947 |
| 2011/0057573 A1 | | 3/2011 | Jutras et al. |
| 2012/0072138 A1 | | 3/2012 | Walters et al. |

FOREIGN PATENT DOCUMENTS

| | | |
|---|---|---|
| WO | WO 02/089088 A2 | 11/2002 |
| WO | WO 2007/034165 A1 | 3/2007 |
| WO | WO 2011/067749 A1 | 6/2011 |

OTHER PUBLICATIONS

Arnold, et al. (2012) "A Win-Win-Win for Municipal Street Lighting: Converting Two-Thirds of Vermont's Street Lights to LED by 2014." *ACEEE Summer Study on Energy Efficiency in Buildings*, 5-14-5-23.

City of Redlands (2010) "Energy Efficient Light Emitting Diode (LED) Street Lighting Conversion Study." Street Lighting Upgrade Program, 19 pages.

Flight Light, Inc. (2013) Series Circuit Power Adapters (Conforms to: FAA E-2159). Retrieved from http://www(.)flightlight(.)com/airportlighting/honeywell_web/H36_SeriesCircuitPA/H36(.)html.

Grothaus, J. and Stewart, J. (2002) "Airport Lighting." Session Highlights from the Airport Technical Assistance Program (AirTAP), 10 pages.

Netty, et al. (2008) "Light Emitting Diodes: An Efficient Choice for Airfield Lighting." 2008 FAA Airport Design Competition for Universities, Kent State University, 50 pages.

San Francisco Public Utilities Commission (2012) "Response to Commissioner Vietor's Question QST-02.24.11.01—Should the City Own or Sell its Street Lights?" SFPUC #795565v, 14 pages. Retrieved from https://infrastructure(.)sfwater(.)org/fds/fds(.)aspx?lib=SFPUC&doc=795565&data=306292525.

Swanton Village Electric Department, Municipal Street Lighting Service, Schedule "MS." Jul. 25, 2011. 2 pages.

European Search Report dated Mar. 3, 2016, in related Application No. EP13865103.9.

\* cited by examiner

DEVICE AND METHOD FOR RETROFITTING OR CONVERTING OR ADAPTING SERIES CIRCUITS

CROSS REFERENCE TO RELATED APPLICATIONS

This application claims priority from provisional patent application 61/738,386 filed Dec. 17, 2012 and incorporated herein by reference.

All referenced documents and application herein and all documents referenced therein are incorporated in by reference for all purposes.

COPYRIGHT NOTICE

Pursuant to 37 C.F.R. 1.71(e), applicant notes that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to electronic or electrical systems. More particularly, it relates to lighting systems and associated systems, methods and components.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

Series connected lighting systems were a popular form of municipal street lighting for many decades in the U.S. In a typical series system, as illustrated in FIG. 1, each lamp is connected in series along one line. Among several reasons for such systems was the even distribution of available current across the load and the control of the entire lighting system from one central location, and various technological limitations at the time, such as the lack of affordable photo-controls.

In the most basic version of such systems a burn-out or absence of a light at one point in the series causes an open circuit and all the lights on that series go dark. A number of prior art improvements were directed to providing a system wherein failure of one of the loads would not interrupt the power to the remaining loads. For example, systems have incorporated various forms of shorting circuits which shunt each lamp. When a lamp fails resulting in an open circuit, the shorting circuit is activated and places a short across the failed lamp thereby completing the circuit and allowing current to flow to the remaining lamps. For example, U.S. Pat. Nos. 1,024,495 and 2,809,329 discuss series connected lamps shunted by shorting circuits.

In other systems, to avoid shorting circuits, each lamp is connected to a different isolation transformer secondary winding. The transformer primary windings are connected in series to the main power source. Thus, because in this circuit, each lamp is connected to a transformer secondary winding, if a lamp fails the power to the other lamps is not interrupted. However, this approach can lead to a bulky circuit and high cost. Another power circuit arrangement is in U.S. Pat. No. 3,969,649, which discusses a bicycle lighting system including two lamps connected in series across a winding of a dynamo. An impedance is connected between an internal tap of the winding and a junction point between the lamps. The impedance is selected to establish system equilibrium whereby the lamp junction point and tap are maintained at the same potential under normal operating conditions despite variations in dynamo and lamp resistance with bicycle speed. If a lamp fails resulting in an open circuit, the power to the remaining lamp is not interrupted.

Despite the above, however, there has been no system allowing a 6.6 AMP type light system to use standard light lamps or fixtures that require effectively constant voltage power supply.

SUMMARY

According to specific embodiments, the present invention is involved with methods and/or systems and/or devices that can be used together or independently to convert or adapt or retrofit series connected constant current municipal series lighting systems by installing a transformer (e.g., any device capable of transforming an effectively constant current source to an effectively constant voltage output) at a number of different locations in the lighting system and optionally effectively at each individual lamp post or lamp installation. In further embodiments, devices are installed at relatively regular intervals along a series current light system to provide a converted voltage source at various locations. Specific embodiments thereby allow use of any lighting fixture or element requiring various constant voltages such as voltages in the range of about 100 to about 277.

In the present discussion, a device that operates generally as described herein is referred to as a constant current to constant voltage transformer, or just a transformer. Other terms used in the art include "series to multiple" transformers or devices or adaptors.

In specific embodiments, the transformer consists of one integrated unit that accepts wiring from a constant current series lighting system and outputs for example in any operational range from about 105 to 277 AC voltage. According to specific embodiments, standard operating voltages, such as 120 or 240, are provided.

In other embodiments, the present invention can be understood as involving new methods related to conversion of large-scale constant current series lighting installations to effectively more modern constant voltage fixtures.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that a number of electrical or electronic systems and methods can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a municipal lighting system using series connection. This should not be taken to limit the invention, which, using the teachings provided herein, can be applied to other situations, involving conversions of multiple constant current series installations to constant voltage source installation.

All references, publications, patents, and patent applications cited herein are hereby incorporated by reference in their entirety for all purposes.

DESCRIPTION OF SPECIFIC EMBODIMENTS

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like.

Unless defined otherwise, technical and scientific terms used herein have meanings as commonly understood by one of ordinary skill in the art to which the invention pertains. In general any methods and materials similar or equivalent to those described herein can be used in practice or for testing of the invention as will be understood in the art.

Unless specifically defined otherwise, words indicating or characterizing operational states should be understood to include any normally expected operational variations. Thus, a "constant" current or "constant" voltage in operational terms will not generally be precisely constant, but will vary within some acceptable limitations. Thus, terms used herein shall have meanings as commonly understood by one of ordinary skill in the art to which the invention pertains.

Description of Example Embodiments

Figure 1:
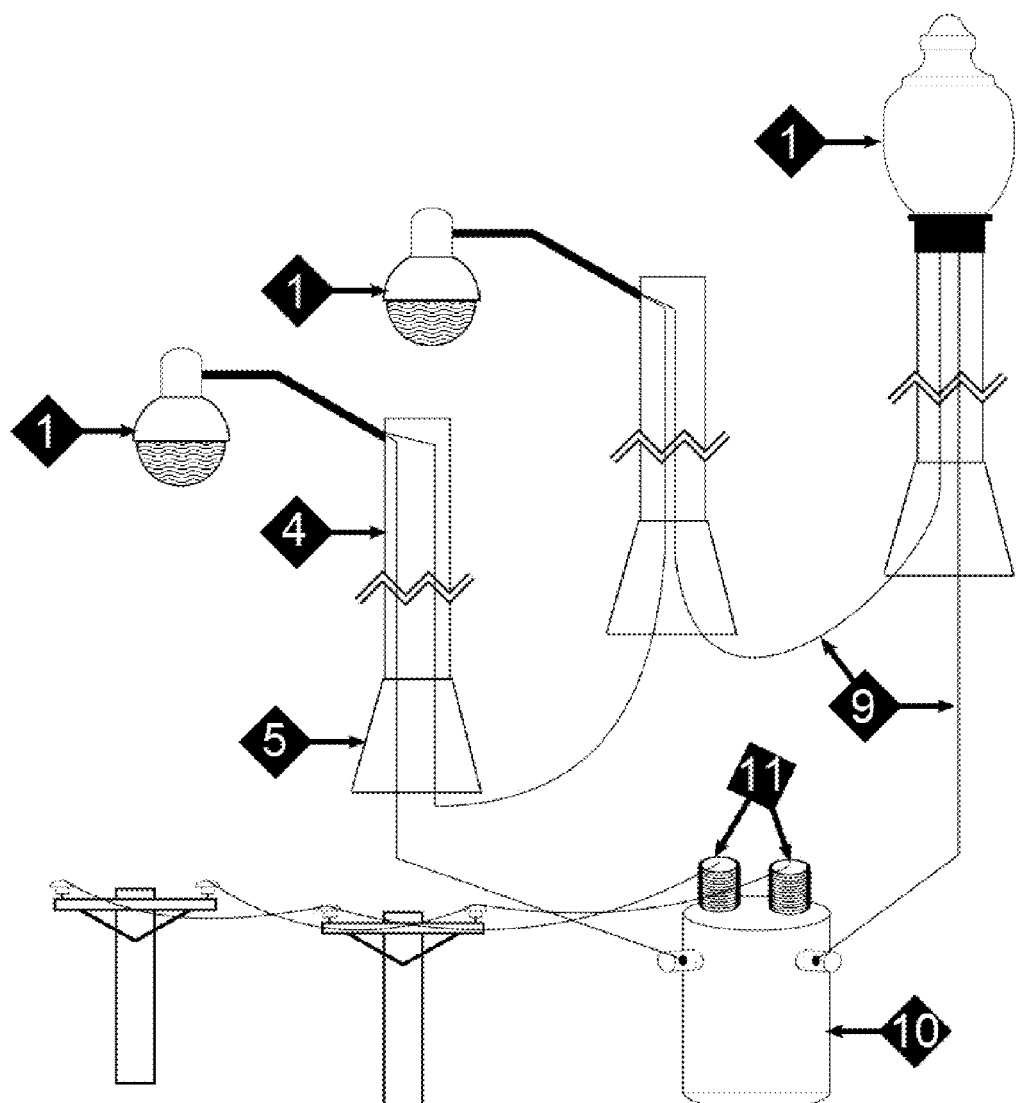
FIG. 1 is a schematic diagram illustrating an example wired series street lighting system with incandescent fixtures according to the prior art.

FIG. 1 is a schematic diagram illustrating an example wired series street lighting system with incandescent fixtures according to the prior art. As discussed above and generally understood in the art, such systems were installed primarily from the 1920s to the 1960s and were seen at the time as having the advantages of:
  Central controls (before the advent of photocontrols)
  Even brightness of incandescent lamps across the series loop due to constant current
  Single conductor meant lower material and construction costs
  Series incandescent lamps were substantially more efficient than multiple-wired lighting technology of the time.
  Allowed for street lighting in far flung places where power lines had not yet been extended FIG. 1 illustrates as an example a wired series street lighting system, with in this particular case the wires placed underground. (Above ground in in-conduit and other wiring systems can also be used in all examples herein.) By way of example, three fixtures 1 are shown connected to the series power source, in this example three incandescent-lamped fixtures. Example light poles 4 and optionally also base 5 of the poles are also shown for illustrative purposes. It will be understood that this schematic is representational in that an actual light system may have dozens to hundreds of poles with either a mixture of different light fixtures or all one type of light fixture. In typical example systems, a series regulator 10 can be used to take power from a primary feeder 11 as is generally understood in the art. The output of 10 feeds a series circuit 9. In an incandescent fixture, such as 1, series line 9 can be directly connected to the lamp or can be connected using various improvements for series lighting systems such as discussed above.

Figure 2:
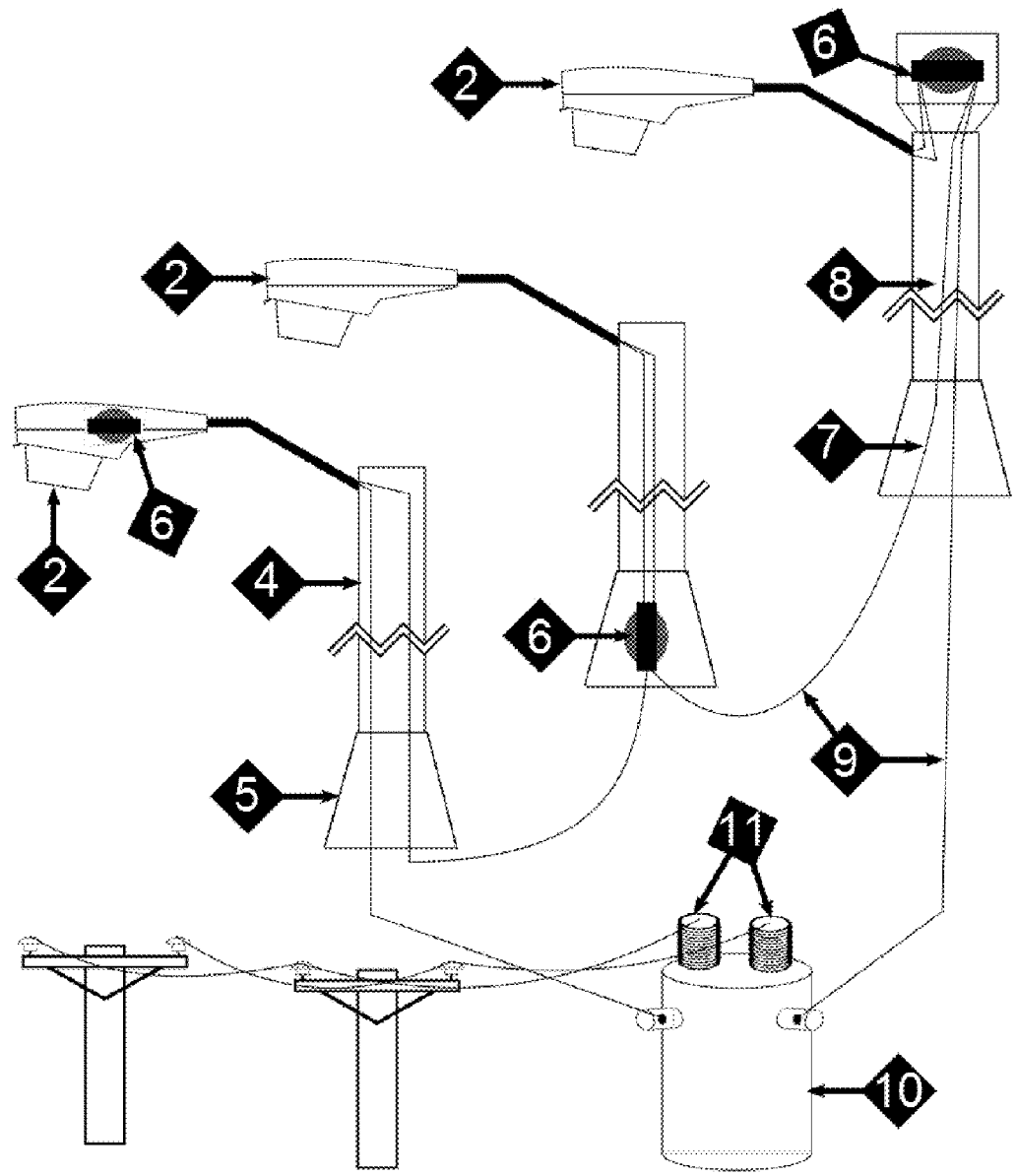
FIG. 2 is a schematic diagram illustrating an example wired series street lighting system with discharge fixtures according to the prior art.

FIG. 2 is a schematic diagram illustrating an example wired series street lighting system with discharge fixtures according to the prior art. As understood in the art, installation of discharge fixtures in municipal lighting systems was begun largely in the 1950s as was done to provide the advantages of reduced power consumption, more light and longer lamp life. While some series incandescent systems were retrofitted for discharge use, other systems were initially installed as discharge. Discharge lamps generally exhibit negative resistance as will be understood in the art.

Generally, constant current is needed to power discharge lamps. A series lighting ballast is a constant current to constant current device.

As with FIG. 1, the illustrated example is a wired series street lighting system with in the wires placed underground. By way of example, three fixtures 2 are shown connected to the series power source, in this example three discharge-lamp fixtures. Example light poles 4 and base 5 of the poles are also shown for illustrative purposes, but again various mountings and light fixtures, such as wall mounting, fence mounting, hanging, etc., can be used for all examples. In a discharge fixture, such as 2, series line 9 is first connected to a ballast such as 6. FIG. 2 illustrates various alternative placements for ballasts in different systems.

Figure 3:
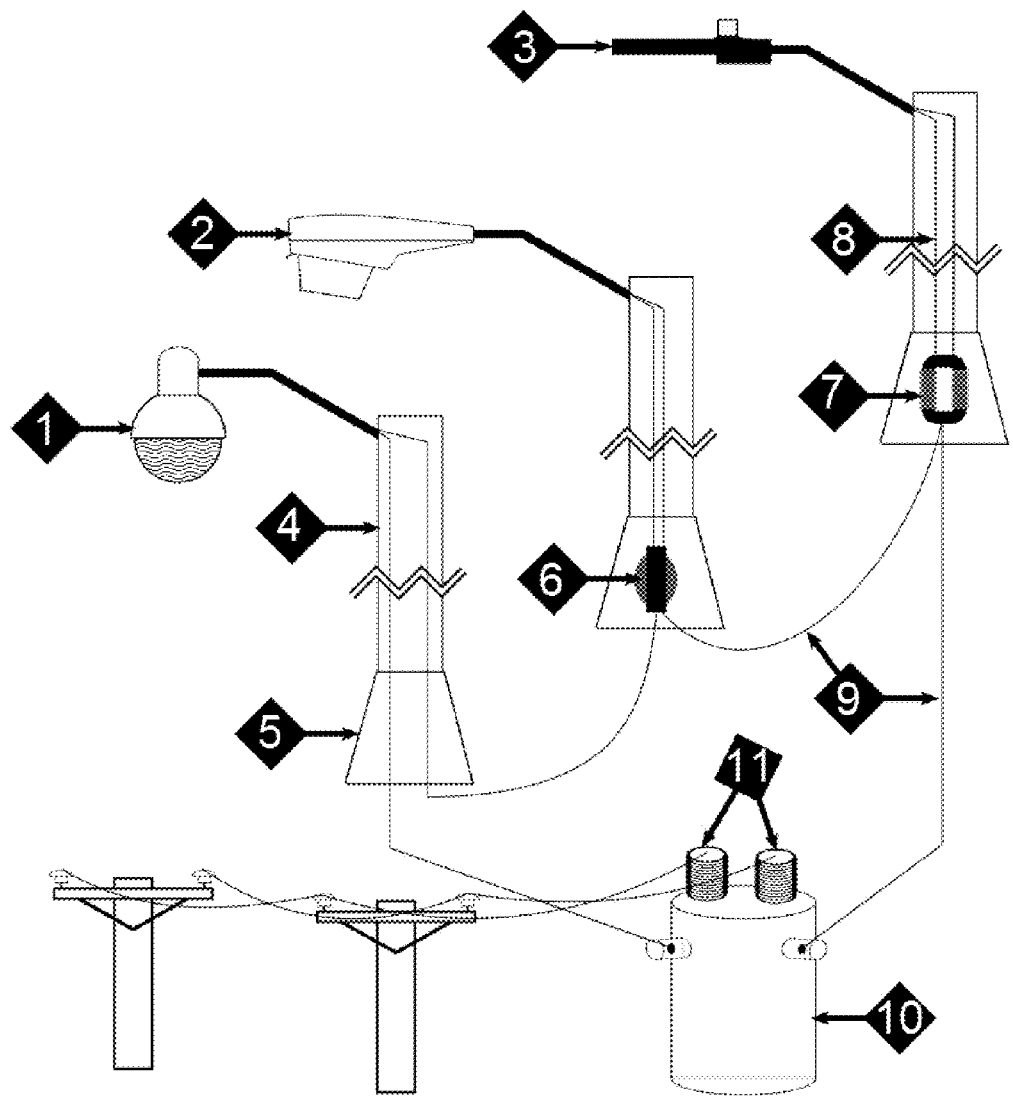
FIG. 3 is a schematic diagram illustrating an example series street lighting system including a wired series incandescent fixture, a discharge fixture, and a transformer according to specific embodiments showing modular retrofitting to constant voltage sources in accordance with specific embodiments.

FIG. 3 is a schematic diagram illustrating an example series street lighting system including a wired series incandescent fixture, a discharge fixture, and a transformer according to specific embodiments showing modular retrofitting to constant voltage sources in accordance with specific embodiments. The wiring and poles are as in previous figures. However, this system includes a modified or retrofitted lighting fixture according to specific embodiments. By way of example, three fixtures are shown connected to the series power source, an incandescent-lamped fixture 1, a fixture with a High-intensity discharge (HID) or similar lamp 2 and a fixture with a light 3 requiring a constant voltage source, such as a light emitting diode (LED) light source. Example light poles 4 are shown, but in this particular example, base 5 generally contains no ballast or transformer, ballast 6 resides in the base of the HID lamp 2, and a transformer 7 with constant voltage output lines 8 according to specific embodiments resides of the poles are also shown for illustrative purposes. It will be understood that this schematic is representational in that an actual light system may have dozens to hundreds of poles with either a mixture of different light fixtures or all converted light fixtures.

In one type of example system, a series regulator 10 can be used to take power from a primary feeder 11 as is generally understood in the art. The output of 10 feeds a series circuit 9. In an incandescent fixture, such as 1, series line 9 can be directly connected to the lamp or can be connected using various improvements for series lighting systems such as discussed above. An HID fixture such as 2 will generally be used with a ballast such as 6 to match the current of the series circuit to the HID lamp. In specific systems, the primary of the ballast is connected to the series line.

A number of types of modern lighting fixtures, e.g., the LED fixture 3, need a line voltage (e.g., an effectively constant 120V) input. Therefore, specific embodiments use a transformer such as 7, placed in such a way as to allow installation or retrofitting of individual light fixtures, such as at the base of the pole. In specific embodiments, the primary coil of the transformer is connected to the series line, the secondary is connected to the lighting fixture. Depending on the configuration, line voltage wires 8 may run up and optionally inside the pole as illustrated.

Figure 4:
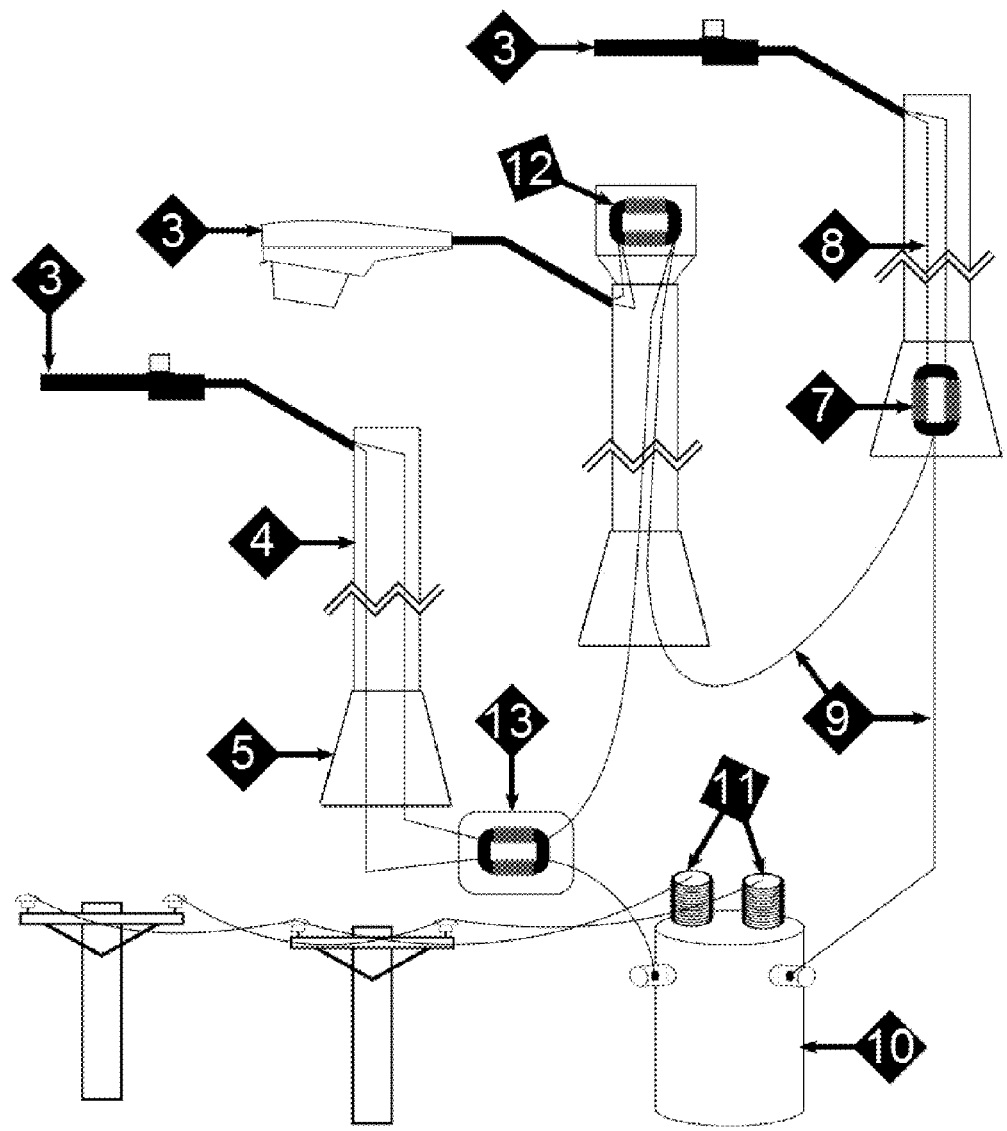
FIG. 4 is a schematic diagram illustrating an example series street lighting system with a plurality of per-installation transformers showing optional placements within a fixture and showing additional optional components in accordance with specific embodiments.

FIG. 4 is a schematic diagram illustrating an example series street lighting system with a plurality of per-installation transformers showing optional placements within a fixture and showing additional optional components in accordance with specific embodiments. According to specific embodiments, transformers as described herein may be placed in the base of a pole, such as 7, at the top or in a head of a pole, such as 12, or in any distance from the installation that allows operation as described herein, such as the underground example 13.

Figure 5:
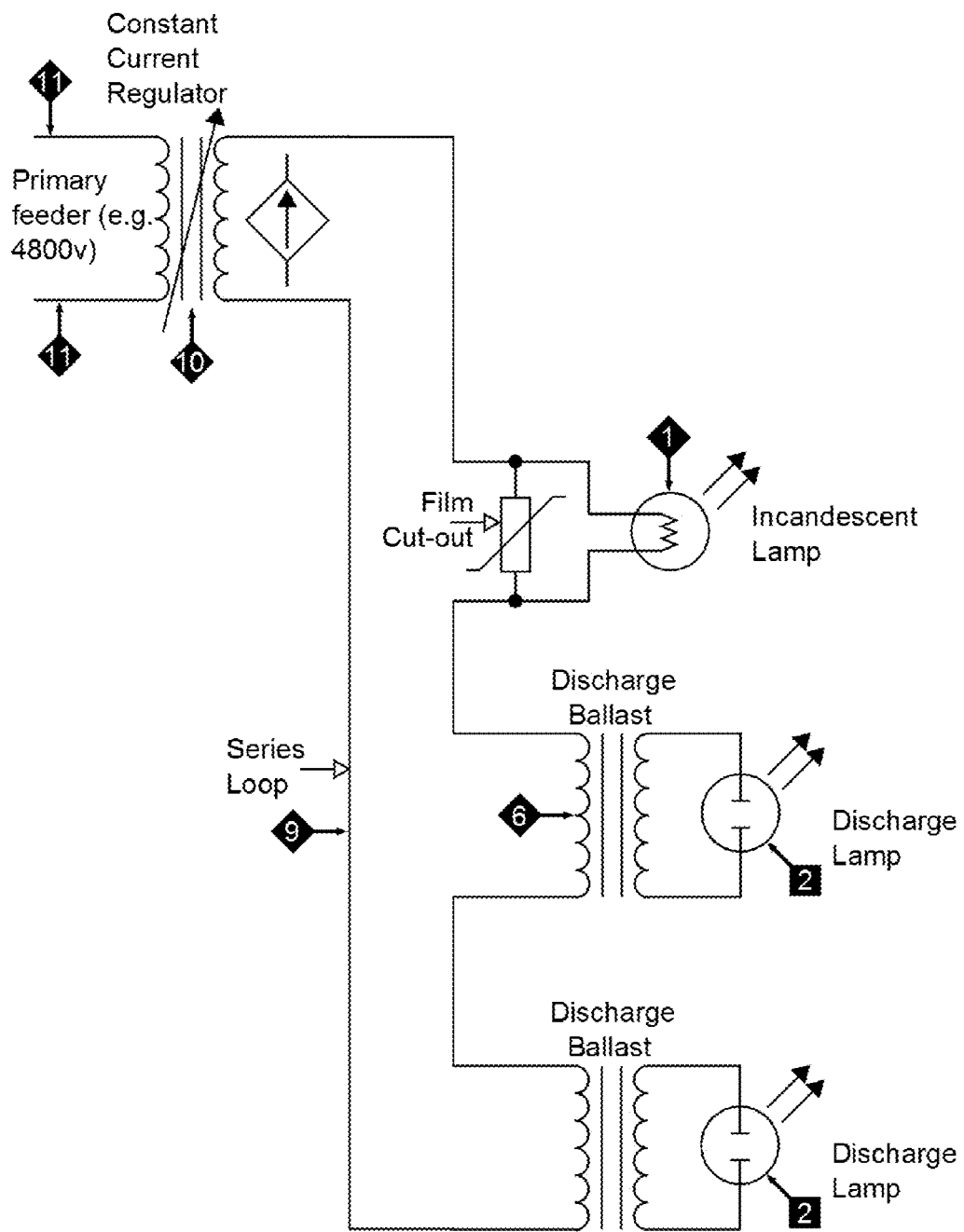
FIG. 5 is a circuit diagram illustrating an example wired series street lighting system with incandescent fixtures and discharge fixtures as would be known in the prior art.

FIG. 5 is a circuit diagram illustrating an example wired series street lighting system with incandescent fixtures and discharge fixtures as would be known in the prior art.

Figure 6:
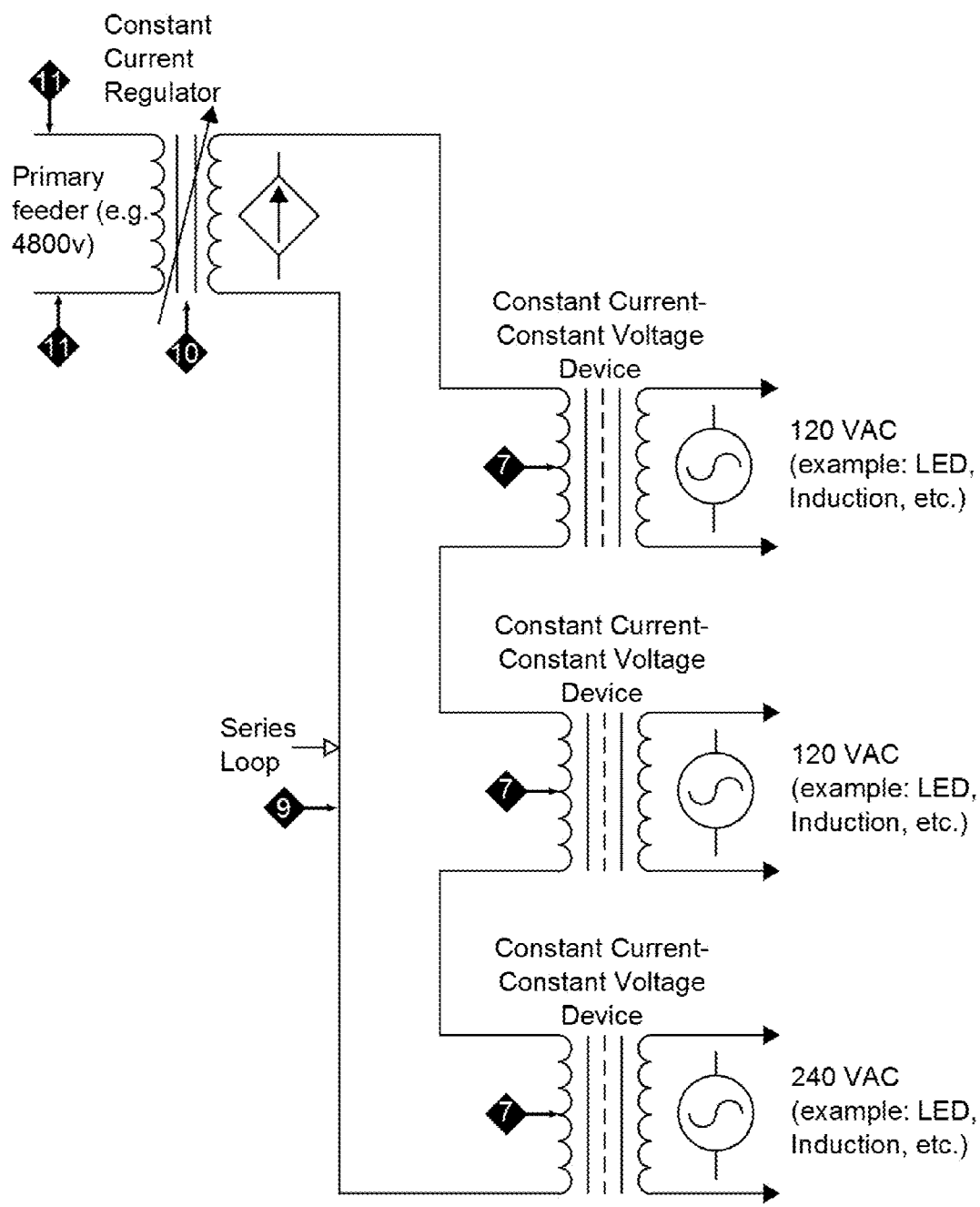
FIG. 6 is a circuit diagram illustrating an example wired series street lighting system with a plurality of constant current to constant voltage transformers in accordance with specific embodiments.

FIG. 6 is a circuit diagram illustrating an example wired series street lighting system with a plurality of constant current to constant voltage transformers in accordance with specific embodiments. The operational circuit components are numbered as in the figures above.

Transformer

According to specific embodiments, some municipal lighting systems and similar systems use constant current series systems with, typically in the United States, a 6.6 A constant current series source. To allow such systems to run line voltage devices (e.g. 120V or 240V street light heads), specific embodiments utilize a specific dual coil constant current to constant voltage or "series to multiple" transformer as described herein. This transformer may also be referred to as a "coupled inductors" transformer.

A transformer, in general, is a well known circuit element that that transfers electrical energy from one circuit to another circuit through inductance via the transformer's coils. In general, a varying current in the primary coil creates a varying magnetic flux in the transformer's core and thus a varying magnetic field through the secondary coil. This varying magnetic field induces a varying voltage in the secondary coil. When a load is connected to the secondary coil, current will flow in this coil, and electrical energy will be transferred from the primary circuit through the transformer to the load. In an ideal transformer, the induced voltage in the secondary ($V_s$) is in proportion to the primary voltage ($V_p$) and is given by the ratio of the number of turns in the secondary ($N_s$) to the number of turns in the primary ($N_p$), generally as follows:

$$\frac{V_s}{V_p} = \frac{N_s}{N_p}.$$

By appropriate selection of the ratio of turns, a transformer can enable an alternating current (AC) voltage to be "stepped up" by making $N_s$ greater than $N_p$, or "stepped down" by making $N_s$ less than $N_p$. An early transformer design used an adjustable gap to regulate the voltage present in the secondary winding.

In some transformers increased flux leakage is desired, and long magnetic paths, air gaps, or magnetic bypass shunts may deliberately be introduced in a transformer design to limit the short-circuit current it will supply. Leaky transformers may be used to supply loads that exhibit negative resistance, such as electric arcs, mercury vapor lamps, and neon signs or for safely handling loads that become periodically short-circuited.

Figure 7A:
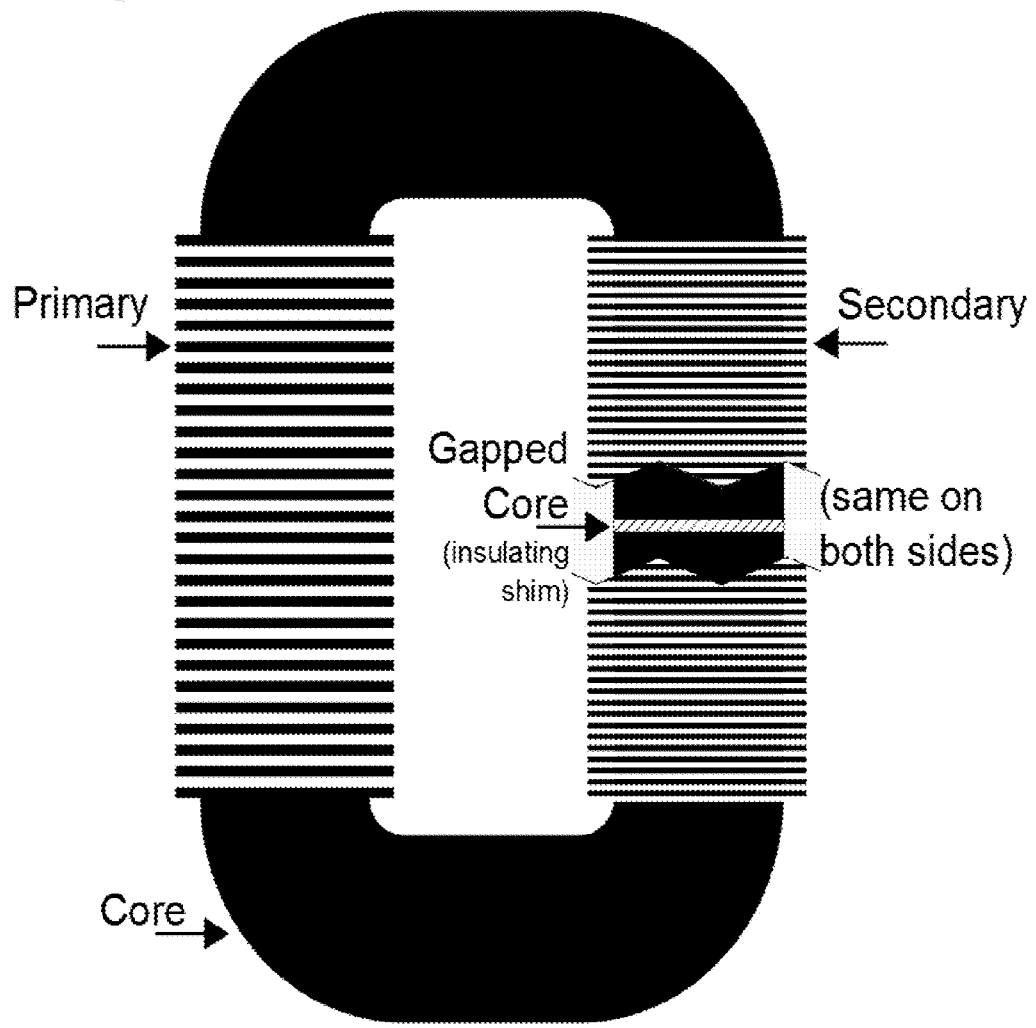
FIG. 7A-B are schematic diagrams illustrating an example transformer using a C-core design according to specific embodiments.
Figure 7B:
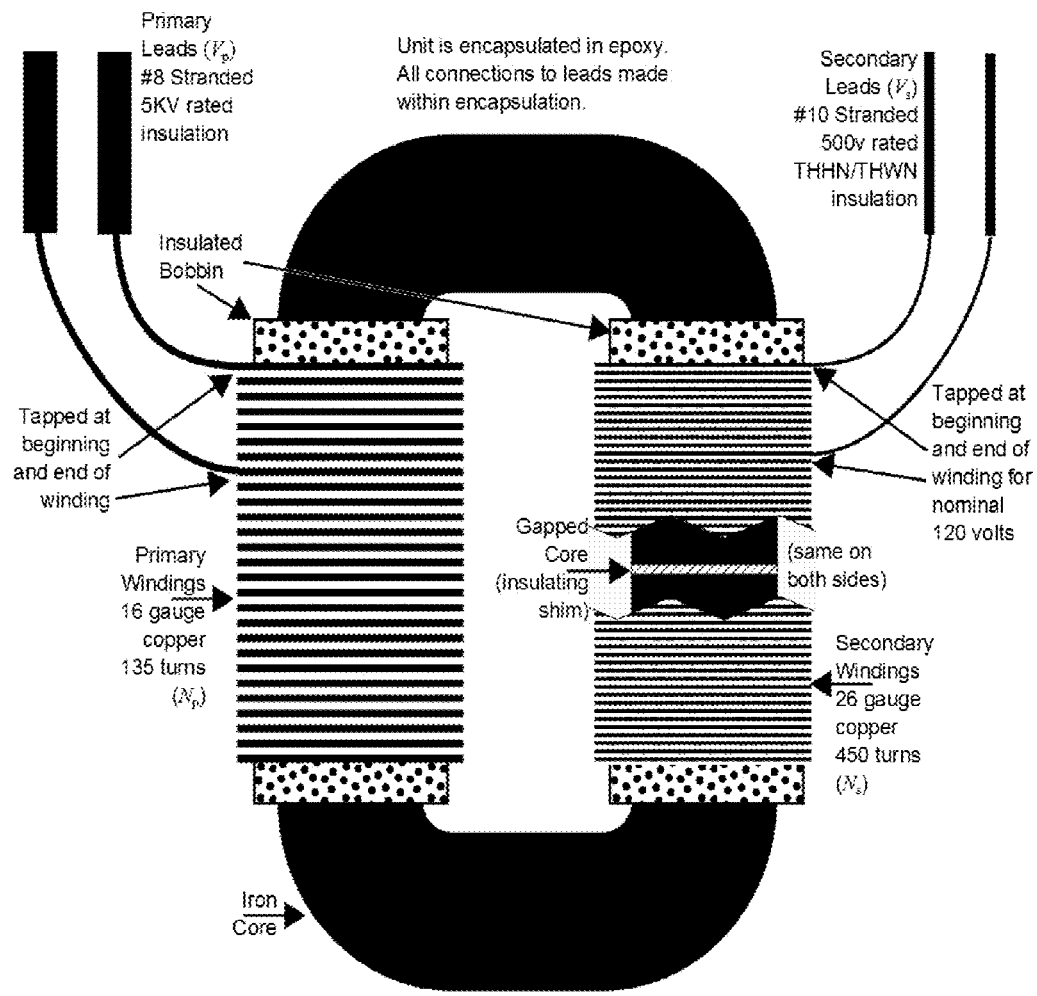

FIG. 7A-B are schematic diagrams illustrating an example transformer using a C-core design according to specific embodiments. In specific embodiments, the transformer includes two coils, a primary connected in series with the series street lighting circuit, and a secondary which is connected to the load, e.g., a line voltage street lighting fixture (or luminaire). The coils are wound on two formers (also at times referred to as bobbins in the art) on either side of a split C-core. Thus, in order to fulfill the constant voltage requirement of the secondary whilst having a constant current primary, an iron core or other ferromagnetic material core gapped with insulating material on both sides is employed so that the inductance of the primary is relatively low compared to the secondary and serves to limit the voltage across that winding. This causes the voltage on the secondary to be relatively constant too, the embodiment thereby providing the desired voltage source characteristics.

In both FIG. 7A-B it will be understood that according to specific embodiments, a gap, as shows on the right portion of the core, is also present on the left portion of the core but is not shown in order to illustrate the core windings.

According to specific embodiments of a transformer as described herein, the transformer provides the added benefit that the secondary voltage will not rise to high levels if the secondary is open circuit compared to conventional current transformers, because the gap limits the primary inductance, which limits the primary voltage, which in turn, limits the secondary voltage.

In further embodiments, in order to fulfill particular demanding insulation requirements to allow for easy retrofitting of existing lighting systems and to minimize the chance of high voltage appearing on the secondary coil under a fault condition, several additional design features may be incorporated into specific embodiments, such as one or more of:

(1) Incorporation into the transformer of a C-core configured so that the physical separation between primary and secondary coils is maximized, thus increasing insulation strength. The C-core has been determined to provide advantages to alternatives such as an EI core, for example, where both windings are next to each other.

(2) Incorporation into the transformer of lead-out wires on opposite sides of the overall enclosed device thereby further increasing physical separation between primary and secondary coils.

(3) Incorporation into the primary coil of extra insulation (e.g., polyester tape or other insulation material) on the bobbin side and optionally also on the outside of the coil, increasing insulation strength between the primary winding and the core. According to specific embodiments, adding insulation to the bobbin, as well as wrapping the exterior of the completed primary winding with polyester tape increases the insulation of the primary coil from the surrounding environment.

(4) In particular embodiments, the whole core is encased into a protective substance to make a sealed solid body, such as potted in a UL94 V-0 specified epoxy. The sealed solid body provides ease and safety of installation during retrofitting as well as during use of the transformer.

(5) In particular embodiments, the primary lead-out wires are #8 stranded 5 kV rated. While this is much thicker than would be specified according to expected voltage or amperage requirements, in particular embodiments, it provides the advantages of
Safety in fault conditions
To match existing construction specifications for series ballasts According to specific embodiments, the transformer design incorporates a combination of features to more easily facilitate retrofitting or adaptation of pre-existing series systems.

FIG. 7B is a further example transformer coil according to specific embodiments. The details of this design, provided as an example only for illustrative purposes, include:

Core: As an example core, an Alpha Core CD16×32×80 C-core (info at www(.)alphacoredirect(.)com/contents/en-us/p367.html) or equivalent or similar can be used.
Core material—M4-011 grain oriented silicon steel.
Core inside dimensions—0.98"×3.15"
Core cross section—1.26"×0.66"
Matching bobbins used, separate primary and secondary bobbins, one on each side of the core, of any suitable material, such as phenolic or similar, to withstand 130 deg. C. service temperature and other operational parameters.
Core halves are gapped with insulating material with 130 deg. C. service temperature rating, 0.015" per side
Core is banded with non-magnetic stainless steel. Banding is used in some specific embodiments as will be understood in the art when the c-core is manufactured from two pieces In a specific example, the band is a thin, flexible strip of stainless steel which encircles both sides of the core and is tensioned to hold it together so it doesn't fall apart.
Design Rated Power using details below: 120 VA
Primary: wound for connection to 6.6 A 60 Hz constant current supply and 15 kV insulation strength, in this example, 135 turns #16 in 3 layers, and bound with polyester tape for extra insulation
Termination is 18" flying leads, #8 stranded 5 kV rated, eg Delco #401028
Leads are coded indicating start and finish of winding
Secondary: wound for nominal 120V output, with in this case 450 turns #26
Termination is 18" flying leads, #10 stranded THHN/THWN insulation
Leads are coded indicating start and finish of winding
Encapsulated in suitable sized insulating open ended or closed potting cup, with external dimensions of about 6"×4"×3".
Vacuum potted with filled epoxy system meeting UL94 V-0
The potting material specifically has 130 deg C. service temperature, (e.g., Solar Compounds SOLARITE EP-211FR with hardener SOLARCURE-2 or Dolphs DOLPHON CB-1054 with hardener RE-200.
Primary and secondary leads are threaded with nirile O-rings arranged to be just under the level of the potting compound, as additional protection against water ingress.

It shall be understood that the above specific description applies to one configuration of transformer operating at the parameters given. Different output voltages or current requirements may require different dimensions, windings, operating temperatures, etc. These variations will be understood by a person of skill in the art having benefit of this disclosure thereby allowing a variety of sizes and capacities of transformers to be constructed as provided herein.

While the C-core transformer discussed above has thus far proven to be the preferred device for retrofitting constant current series systems to constant voltage systems, other devices may be used that perform generally as described herein. For example, various digital voltage and current control devices can be configured and/or programmed to provide operation as described herein. Similarly, a switching power supply of suitable design can be configured to perform a similar function in specific applications.

While municipal lighting systems are one use of the invention, the invention has other uses where constant current power sources are in use. A particular area of interest is in airfield power systems.

Airfield lighting power systems include typically series wired systems for powering the runway, taxiway and apron marker lights on an airfield. These are the lights embedded in the surface and on stalks and towers adjacent to the runway and taxiways, that denote the center and edges of these areas, and other information that pilots use to navigate, for example lighted signs and wind cones. In most cases, airfield lighting uses low-wattage incandescent or LED lighting sources, with individual constant current to constant current isolation transformers at each fixture location.

It is sometimes desired to operate other electrical devices in runway/taxiway areas where no other power source is available. Previous "power adapters" have been used to provide a more constant voltages. (potentially ranging between 80 and 300v on secondary). An transformer as described herein provides a much more steady voltage at a given primary amperage. The specific characteristics of constant current series systems as described above are essentially the same for the airport lighting described above.

One key difference between airfields and street lighting series systems is the ability to dim airfield lighting. Regulators on airfield systems are frequently designed with multiple steps (from 6.6 A down to 2.8 A), allowing an incoming pilot to adjust the light levels to a comfortable brightness. Making this adjustment changes the amperage on the series circuit. Some lights on the system must stay at the same brightness, even when others are dimmed. Wind cones, for example, typically need to stay lit at a constant level of brightness. Wind cones and lighted signs may benefit from conversion to more modern LED sources requiring constant voltage. Transformer as described herein can be used for this purpose within an established secondary voltage range.

Figure 8:
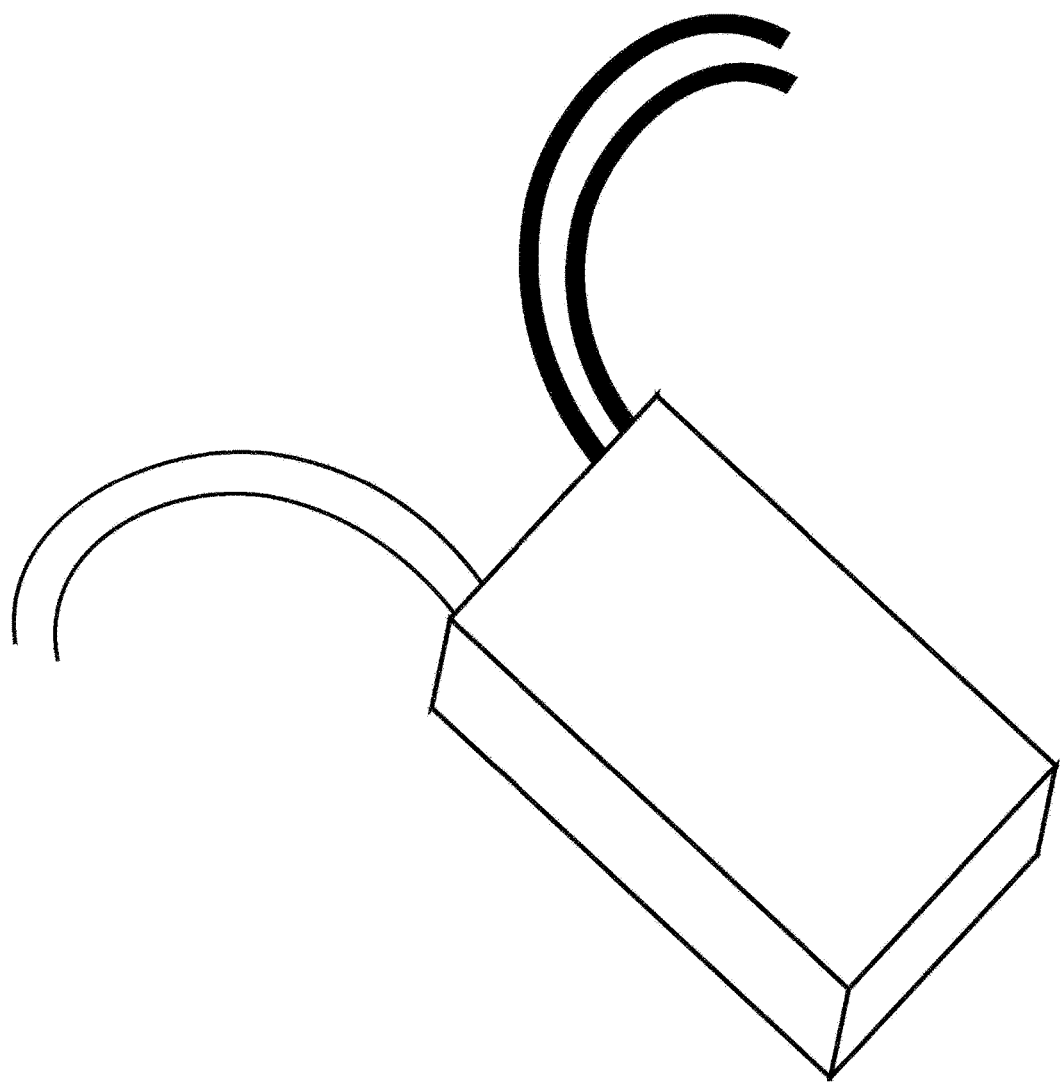
FIG. 8 is a side-pan view of an example transformer embedded in epoxy or similar material, according to specific embodiments.
Figure 9:
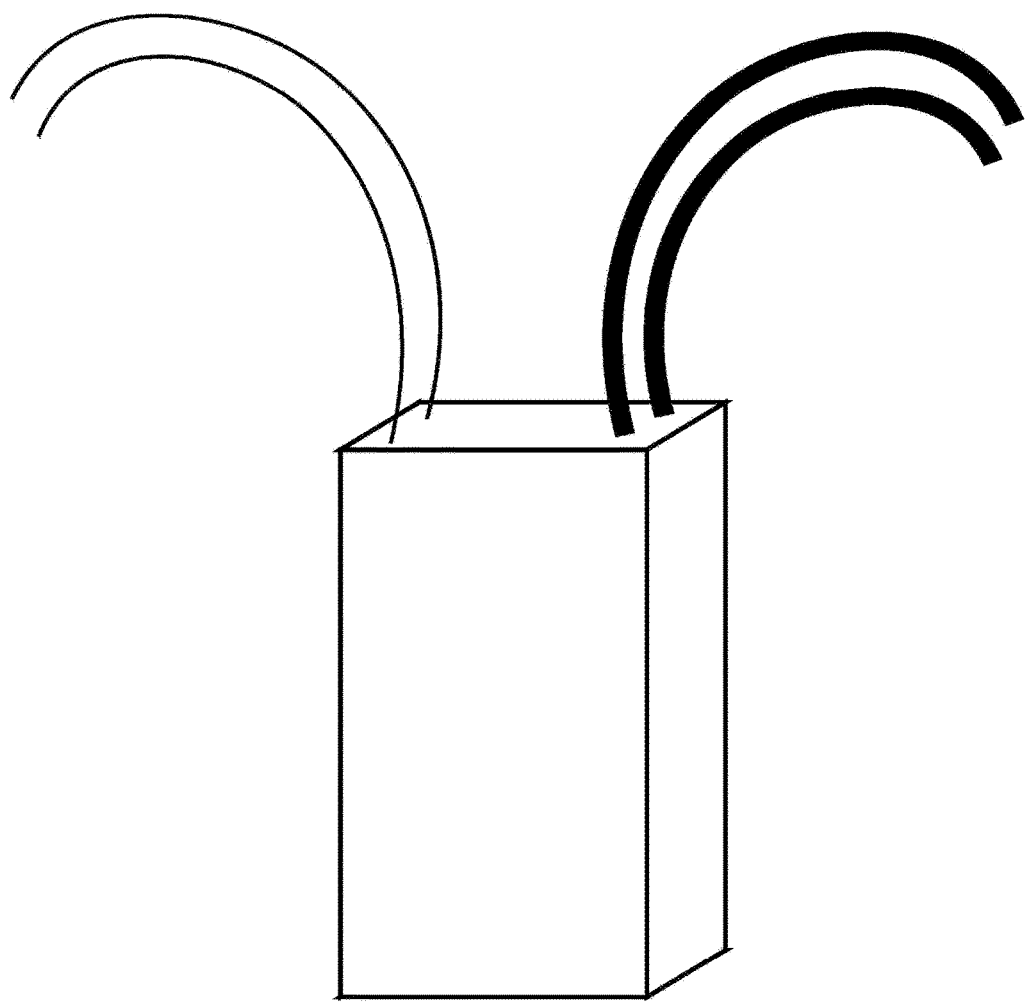
FIG. 9 is a top-pan view of an example transformer embedded in epoxy or similar material.

FIG. 8 is a side-pan view of an example transformer embedded in epoxy or similar material, according to specific embodiments. FIG. 9 is a top-pan view of an example transformer embedded in epoxy or similar material. In further embodiments, in order to have adequate environmental protection for the environment in which they will be used, adequate water ingress protection being particularly important, a transformer as described herein once constructed is sealed in an insulation resin, ceramic, plastic, or other material.

To allow for easy retrofitting or adapting of existing series installations, a transformer according to specific embodiments provides terminations with type, gauge and insulation of lead-out wires needed for particular lighting systems.

Size and Dimensions

As illustrated herein, specific embodiments of STM's can be mounted within a light fixture, on the top of a light fixture, or underneath a light fixture. Using the teachings provided herein, transformers of the appropriate size to optimize the ease of retrofitting existing series systems can be provided. These sizes may vary depending on the installation. One prototype transformer has approximate dimensions of 2.5"× 3.5"×6" and weighs approximately 5 lbs. Thus the total dimensions L+W+H is 12 inches. Another prototype transformer has approximate dimensions of 1.5"×3"×4" and weighs less than approximately 5 lbs. Another prototype transformer has approximate dimensions less than 2.5"× 3.5"×6" and weighs less than approximately 5 lbs. Another prototype transformer has approximate dimensions greater than 2.5"×3.5"×6" and weighs more than approximately 5 lbs.

Other Embodiments

The invention has now been described with reference to specific embodiments. Other embodiments will be apparent to those of skill in the art. The general structure and techniques, and more specific embodiments which can be used to effect different ways of carrying out the more general goals are described herein. It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed:

1. A device configured to allow a constant current system power source to supply power to a constant voltage load, the device comprising:
   a primary coil configured to be connected to a constant current type power source circuit;
   a secondary coil configured to be connected to the constant voltage load; and
   wherein the coils are wound on a split C-core comprising a first core gap and a second core gap;
   wherein the primary coil is wound on a first side of the core across the first core gap and the secondary coil is wound on a second side of the core across the second core gap; and
   wherein the secondary coil has a higher number of windings than the primary coil.

2. The device according to claim 1 further wherein:
   the constant current system power source is a 6.6 A constant current series type power source; and the constant voltage load is a LED lamp or a high-intensity discharge (HID) lamp.

3. The device according to claim 2 further comprising:
   an outlet operationally connected to the secondary coil, and able to receive a plug from any compatible constant voltage device, allowing the device to be temporarily attached to the constant voltage load.

4. The device according to claim 1 further wherein:
the core is an iron (or ferromagnetically analogous) split C-core.

5. The device according to claim 1 further wherein:
the core is an iron (or ferromagnetically analogous) split c-core gapped with insulating material on both sides.

6. The device according to claim 1, wherein the device is configured to provide an effectively constant voltage output whilst having a constant current input by having an input inductance that is relatively low compared to the output inductance and thereby configured to limit the voltage from the input to the output under secondary open circuit conditions.

7. The device according to claim 4, further wherein the device is configured so that the output voltage at the output terminals will not rise to high levels when the output is open circuit.

8. The device according to claim 4, wherein the device comprises a sealed unit having two input connections for connecting in a series to constant current source and at least one output connection that is configured to provide an effectively constant voltage output.

9. The device according to claim 1, wherein the device is not electrically coupled directly to a digital control device configured to control the voltage output.

10. A device configured to allow a constant current system power source to supply power to a constant voltage device, the device comprising:
a primary coil configured to receive power from a 6.6 A constant current series power source;
a secondary coil configured to be connected to a constant voltage load; and
wherein the coils are wound on a split C-core comprising a first side with a first gap and second side with a second gap, wherein the primary coil is wound a first number of turns on the first side of the core and the secondary coil is wound a second number of turns on the second side of the core, wherein the first number of turns is less than the second number of turns;
an electrical insulator disposed upon the primary coil; and
an electrical insulator in the first gap and in the second gap;
whereby the of the insulated primary coil and insulated core gap core regulate coupling between the primary and secondary coils.

11. The device according to claim 10, wherein the first gap or second gap is an adjustable gap, thereby providing for regulation of a voltage present in the secondary winding.

12. The device according to claim 10, where the insulator in the first gap or in the second gap comprises an insulating shim located in the core gap.

13. The device according to claim 10, further including a protective encasement disposed about the split C-core, the primary coil, and the secondary coil.

14. The device according to claim 10, further comprising an electrical outlet in electrical contact with the secondary coil and adapted to releasably receive a connection plug of constant voltage device.

15. The device according to claim 10, wherein the constant voltage device is a LED lamp or a high-intensity discharge lamps (HID) lamp.

16. The device according to claim 10, wherein the 6.6 A constant current series power source is a street lighting power source or an airport lighting system power source.

17. The device of claim 1, wherein the primary coil is not wound across the second core gap or the secondary coil is not wound across the first core gap.

18. The device of claim 1, wherein the secondary coil provides a constant voltage output.

19. The device of claim 1, wherein the device comprises a constant current to constant voltage transformer.

20. The device of claim 1, wherein the secondary coil is directly connected to the constant voltage load.

21. The device of claim 10, wherein the primary coil is not wound across the second core gap or the secondary coil is not wound across the first core gap.

* * * * *